June 14, 1938.  O. RASMUSSEN  2,120,922

HYDRAULIC BRAKE WHEEL CYLINDER PACKING

Filed May 13, 1936

Inventor
Olaf Rasmussen
By Blackmore, Spencer & Flint
Attorneys

Patented June 14, 1938

2,120,922

UNITED STATES PATENT OFFICE 2,120,922

HYDRAULIC BRAKE WHEEL CYLINDER PACKING

Olaf Rasmussen, Dayton, Ohio, assignor to General Motors Corporation, Detroit, Mich., a corporation of Delaware Application May 13, 1936, Serial No. 79,417

1 Claim. (Cl. 286—26)

This invention relates to sealing means to prevent escape of fluid around a piston reciprocable in a cylinder. It has been designed especially as a seal for a piston within the wheel cylinder of a hydraulic brake applying system.

An object of the invention is the provision of a seal for the purpose stated which shall be very efficient and at the same time comparatively inexpensive to manufacture.

As another object the seal makes possible a cheaper construction of piston and a reduction in cost of the cylinder.

Other objects and advantages will be understood from the following description.

In the drawing accompanying this description:

Figure 1:
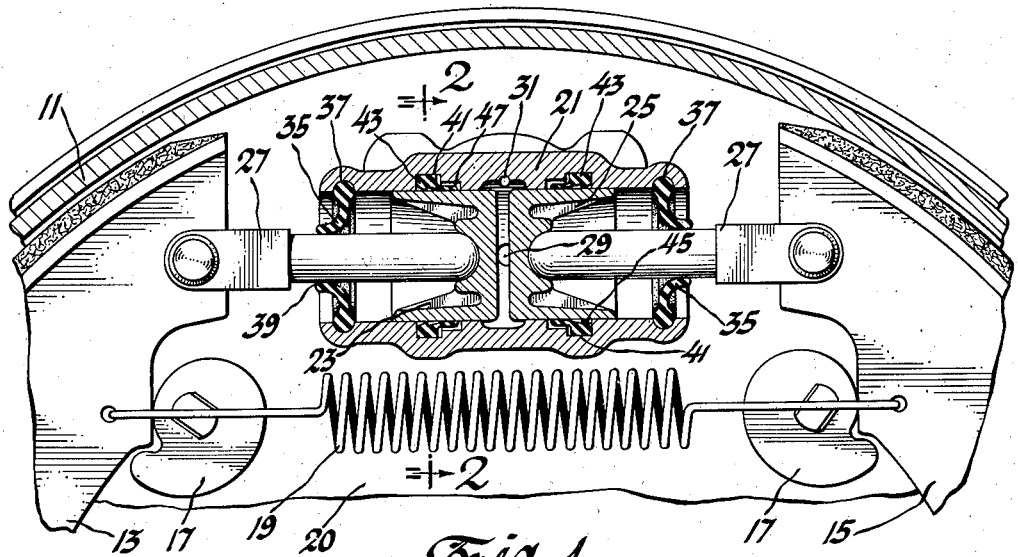
Fig. 1 is a transverse section through a brake drum and brake applying means, the novel seal being shown.
Figure 2:
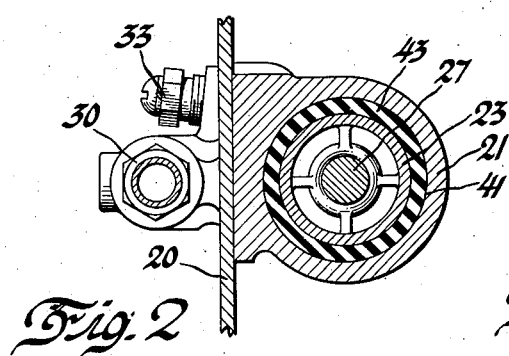
Fig. 2 is a section on line 2—2 of Fig. 1.

Referring to the drawing, numeral 11 represents a conventional brake drum engaged by shoes only the adjacent ends of which appear in the figure where they are marked 13 and 15. At 17 are adjustable stops to be engaged by the shoes when retracted from the drum by the usual brake releasing spring 19.

Within the drum and secured by any suitable fastening means to the cover plate 20 is a cylinder 21 within which reciprocate pistons 23 and 25. Plungers 27 transmit to the shoes the movements of the pistons. An opening is shown at 29 through which fluid under pressure is delivered by a conduit 30 leading to that part of the cylinder between the pistons from a master cylinder, not shown, of a hydraulic brake system. There is also shown an opening from the same space at 31. Opening 31 is to permit the venting of air. It is normally closed by a plug 33. Foreign matter is excluded from the interior of the cylinder outwardly of the pistons by boots 35. The outer periphery of the generally circular boot may be received within a channel 37 of the cylinder. The inner margin of each boot engages the plunger at 39.

The cylinder is formed with two circular grooves 41, each rectangular in section, one opposite each piston. Within each groove is received the generally rectangular part of a seal represented as a whole by numeral 43, the seal being made of rubber. Radially inward of the rectangular part, the seal is formed with a pointed lip 45. Axially beyond the rectangular part there is a second similarly shaped pointed lip 47. The space between the lips takes the form of a somewhat deeply indented notch 49. The radius of the piston is somewhat greater than the radius of the lips at the points thereof so that when the piston is assembled in the cylinder the said lips are compressed and flattened out much as is shown by Fig. 1, whereby there is in effect a twin lip seal which very effectively prevents the escape of fluid from around the piston.

Figure 5:
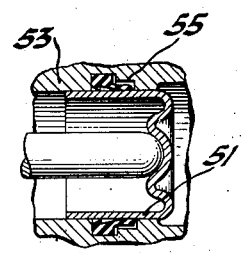
Fig. 5 shows a seal like that of Fig. 3 used with a special form of piston.

So effective is this seal that it makes possible a lesser expensive form of piston than is generally employed. In Fig. 5, for example, there is shown a piston in the form of an inexpensive stamping 51 sliding in a cylinder 53, the same seal being used and anchored as before in a groove 55 in the wall of the cylinder. Also with this effective but nevertheless inexpensive form of seal, it is possible to construct and use a cylinder without giving its bore the high grade and expensive finish as is usually found necessary.

Figure 3:
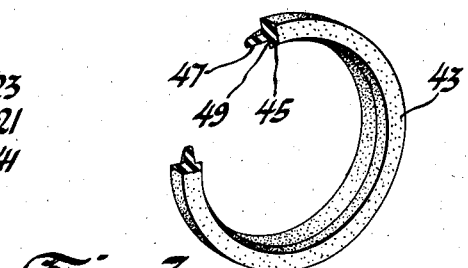
Fig. 3 is a perspective of one form of seal.
Figure 4:
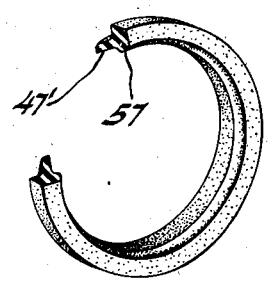
Fig. 4 is a perspective of a second embodiment.

Fig. 4 shows a modified form wherein the same conformation is used for insertion in the cylinder groove. This form is provided with a lip 47' not unlike lip 47 of the form shown by Fig. 3. Instead of the second pointed lip 45 there is a rounded part marked 57 radially beneath the rectangular part. When the piston is assembled, since the lip 47' and part 57 are of lesser diameter than that of the piston, the piston compresses and preloads the rubber to make of it an effective seal.

I claim:

In combination, a cylinder, a piston slidable therein, one of said cooperating elements having an angularly walled annular recess, said recess having a reduced axial extension, a rubber ring bottoming in said recess and having a part thereof extended radially and subject to radial pressure by said other element, a portion of said rubber ring being deformed into said extension, the part of said rubber ring which is subject to radial pressure including two tongues, each tongue extending at an angle to the axis of the cylinder, one tongue being opposite the recess and the other opposite the extension.

OLAF RASMUSSEN.